United States Patent [19]

Richmond

[11] 4,421,467
[45] Dec. 20, 1983

[54] INJECTION MOLDING MACHINE DIAGNOSTIC SYSTEM

[75] Inventor: Dennis W. Richmond, Loveland, Ohio

[73] Assignee: HPM Corporation, Mount Gilead, Ohio

[21] Appl. No.: 357,185

[22] Filed: Mar. 11, 1982

[51] Int. Cl.³ .................................................. B29G 5/00
[52] U.S. Cl. ..................................... 425/136; 425/138; 425/150; 425/169; 425/170; 425/171; 425/173
[58] Field of Search ............... 425/169, 170, 171, 172, 425/173, 136, 138, 150

[56] References Cited

U.S. PATENT DOCUMENTS

| | | |
|---|---|---|
| 2,340,673 | 2/1944 | Lotz . |
| 2,786,234 | 3/1957 | Beyer .................................. 425/150 |
| 3,454,990 | 7/1969 | Collins ................................. 425/173 |
| 3,553,786 | 1/1971 | Bentley ............................... 425/171 |
| 3,628,901 | 12/1971 | Paulson . |
| 3,647,309 | 3/1972 | Thompson ........................... 425/150 |
| 4,146,601 | 3/1979 | Bishop . |

OTHER PUBLICATIONS

HPM Tech. Data, Injection Molding MACO IV Control Brochure.

*Primary Examiner*—Donald E. Czaja
*Assistant Examiner*—James C. Housel
*Attorney, Agent, or Firm*—Jeffers, Irish, Hoffman

[57] ABSTRACT

A system for diagnosing fault conditions in an automatic or semiautomatic machines, such as injection molding machines. The diagnostic system comprises a display panel having a plurality of lights or other visual indicators grouped in sets for the respective subsequences of the machine cycle, and if no fault conditions occur and the machine cycles properly, the sets of lights will be energized in succession so that the operator is continuously apprised of the condition of the machine. If a fault condition should occur, one or more of the lights in the set corresponding to the subsequence that the machine is presently implementing will not be energized, and the pattern of energized lights in that set is coded to the particular fault condition that has occurred. By correlating the code with a fault code listing, the operator can quickly identify the location and nature of the malfunction.

15 Claims, 7 Drawing Figures

INJECTION MOLDING MACHINE DIAGNOSTIC SYSTEM

BACKGROUND OF THE INVENTION

The present invention relates to a system for monitoring the operation of a machine as it cycles through its operating sequence, and in particular to a system which diagnoses fault conditions and presents the nature and location of the fault condition to the machine operator in an easily discernible manner. In a particular embodiment of the invention, the system is employed with a plastics injection molding machine, although the invention has broader application to other types of machinery.

Present-day injection molding machines operate on a continuous basis to sequentially mold the plastic parts with little or no intervention on the part of the machine operator. The clamping mechanism first closes the two halves of the mold and the rotating plasticizing screw in the extruder plasticizes the plastic material until it is molten and at the same time retracts thereby building up a charge of molten plastic material in front of it. When the screw has retracted sufficiently to build up the proper charge of material and final clamping pressure has been exerted on the mold halves, the rotation of the screw is stopped and it is rammed forwardly by the injection cylinder to inject a charge of molten material into the mold. After the injected mass hardens sufficiently, the mold halves are opened by the clamping mechanism, and the finished part is ejected. This sequence of operations is then repeated each time that an additional part is molded.

Present-day injection molding machines, and other types of machinery such as die casting machines, are designed to cycle automatically under the control of an electronic controller. The controller has as inputs electrical signals from a large number of sensing devices, such as limit switches, pressure switches and relays, which are actuated when certain moving parts reach predetermined positions, or when the hydraulic pressure within a hydraulic cylinder exceeds or falls below predetermined limits, or when a timer associated with a particular operation of the machine times out. For example, the determination of when the movable platen for the mold is opened sufficiently to permit part ejection is made by a limit switch that is contacted either directly by the movable platen or by an element rigidly connected thereto. The attainment of final clamping pressure of the clamping mechanism sufficient to withstand the internal pressure within the mold during injection is sensed by a pressure actuated switch connected to the high pressure clamping cylinders. Generally, the output signals from these various sensing devices are connected by wires to the controller, which may be a very complex arrangement of relays, discrete electronic logic circuitry, or a programmable microprocessor. In a manner well known in the art, the controller reads the conditions on one or more of the inputs from the sensing devices, and if there are no fault conditions present, causes the machine to sequence through the next step, and when this has been accomplished, another group of inputs are monitored for the absence of fault conditions before the next step of the sequence is implemented.

When a fault condition is sensed by the controller, the operation of the machine is generally stopped immediately at that point, and the operator is advised of the presence of a fault condition by a visual and/or audible alarm. Unless a very sophisticated fault condition readout is employed, however, the operator will not be advised of the specific fault which has occurred, and the only indication that he will receive is that a fault condition is present. Most injection molding machines include an array of lights which are respectively associated with the various sensing and control solenoids, relays, timers and the like on the machine. When the respective solenoid or relay is activated, its associated light will be illuminated. Although the operator could check the light bank against a reference listing for the machine when a fault condition occurs to determine which relay, solenoid, timer, etc. has not activated when it should or has activated when it should not for that particular point in the machine sequence, this is a very complex procedure due to the large number of lights which will be illuminated at any one time.

When a malfunction occurs, the operator generally must rely on his experience and general knowledge of the operation of the machine to narrow down the possibilities for the fault condition. Once this is done and he determines at what point in the machine sequence the machine is presently in he can then check what he considers to be the possible causes for the malfunction by reading from the manual for the machine what output lights should be illuminated as against the actual condition of the lights on the light array. This is a trial and error technique, and greatly increases the machine down time necessary to correct the malfunction and resume normal operation of the machine. Although if the operator monitors closely the operation of the machine by observing directly the movement of the parts, he will be able to more rapidly localize the cause for the malfunction, experience has shown that most operators operating an automatic or semiautomatic machine do not pay close attention to each operating step of the machine. Monitoring the pattern of lights on the output array is even more difficult due to the large number of lights which are illuminated at any one time and the various combinations of lights, some of which will be illuminated more than once during the machine sequence.

With most prior art diagnostic systems of the type described above, a considerable amount of time is required for the operator to locate the malfunction before remedying the malfunction can even occur. Since the profitability of a molding operation depends, to a great extent, on the amount of poundage that can be processed over a period of time, the amount of time required to locate and cure a malfunction is critical. Furthermore, the plastic within the barrel during a cessation of operation of the machine is likely to become overheated and therefore unsuitable for use, and even damage to the machine may occur during the time that operation is halted.

Although very sophisticated microprocessors can continuously monitor and display the machine sequencing and provide for accurate location of the fault conditions, they are often quite expensive and difficult to implement in that special programming may be required. Some microprocessor controlled diagnostic systems include the ability to call up a specific portion of the machine's sequence on a CRT screen to aid in troubleshooting. For example, when a specific solenoid is not energizing, the operator selects the output associated with that solenoid, enters the output address through a keyboard, and the portion of the machine sequence associated with that output is displayed on the screen. The screen also indicates whether the contacts are open or closed in the specific sequence. Although the use of this type of a diagnostic system is much more rapid than physically checking between the machine manual and the output light array as discussed above, the operator must still take certain steps to localize the malfunction. A further disadvantage is that the operator may not be sufficiently skilled in the use of computer-type machinery to effectively utilize the microprocessor interface to locate fault conditions.

More sophisticated microprocessors have been used for monitoring the operation of machines, such as injection molding machines, wherein color bars or other display graphics can indicate the movement of the various machine parts as it cycles through its operation. The screen can also display faults which occur during the machine cycle. Although such microprocessor based systems convey a great deal of information to the operator, they are software implemented and relatively expensive.

SUMMARY OF THE INVENTION

The above-discussed problems and disadvantages of prior art diagnostic techniques are overcome by the diagnostic system of the present invention, which comprises grouping the monitor switch means, which may be the actual controller relay contacts or electronic switches associated with the limit switches, pressure sensitive switches, timers and the like mounted on the machine. The grouped monitor switch means are associated with a plurality of sets of visual indicators that are energized in sequence as the machine properly cycles through its operating sequence. If a malfunction occurs and one of the monitor switch means is not activated, then the visual indicator associated with it will not be illuminated, and the exact location of the fault will be apparent to the operator by observing the pattern of illuminated lights in that set.

In the case of an injection molding machine, for example, eight different machine subsequences have been identified for one complete machine cycle. The subsequences comprises the following: (1) motors running, (2) single cycle, (3) clamp forward, (4) clamp pressure, (5) injection forward, (6) injection low pressure, (7) extruder run, and (8) clamp reverse. For this particular type of machine, the indicator lights are arranged in eight rows of three lights each for the respective subsequences, and as the machine runs through its entire cycle, the eight rows will be sequentially illuminated with each light in the respective row illuminated if no fault conditions are present and the machine is operating properly. The light display panel visually indicates to the operator the exact position in the sequence of operation which the machine is in. Furthermore, the monitor switch means for all of the solenoids, relays, timers, etc. for that particular subsequence of the machine are interconnected which the three lights in such a manner that the pattern of illumination of the lights indicates the nature of the fault. For example, if none of the lights are illuminated, this may indicate that the mold cores are not set, and if only the third light is illuminated, then the clamping pressure is not sufficiently high to permit injection to take place. Other combinations of illuminated lights can be coded in a similar manner to indicate immediately to the operator, who need only refer to a very simple lookup chart, the exact nature and location of the fault condition.

As mentioned earlier, the indicator lights are associated with existing monitor switch means, thereby avoiding the necessity for installing new sensing devices on the machine. This also enables the diagnostic system to be installed on virtually any type of machine, and installation can be effected without the necessity for disrupting existing wiring.

Since the diagnostic system is wired directly to the machine and continuously provides a readout of the cycling of the machine with an automatic and immediate indication of the location and nature of the fault, it is not necessary for the operator to interrogate a microprocessor to retrieve additional information as to the fault condition, as in the case of the microprocessor controlled diagnostic system described earlier. By continuously advising the operator of the stage of the operating sequence in which the machine is at any time, the operator becomes more familiar with the machine operation in a shorter period of time, and may even develop the ability to read the fault conditions directly off the indicator panel without the necessity for referring to the lookup table. All of this enables the operator to very quickly isolate the malfunction, clear the malfunction, and resume operation of the machine.

Specifically, the present invention relates to a diagnostic monitoring system for a machine having a plurality of parts that normally assume proper given states during the cycling of the machine through a plurality of steps in its operating sequence. The diagnostic monitoring system comprises a plurality of monitor switches, a plurality of means connected between the parts of the machine and the monitor switches for activating each monitor switch when the pertaining machine part assumes its proper state during the cycling of the machine and deactivates each monitor switch when the pertaining machine part fails to assume its proper state, and a plurality of test terminals grouped in a plurality of sets. The test terminals are operatively connected with the monitor switches for one of energizing or deenergizing the respective groups of terminals in succession as the machine cycles through its operating steps if the monitor switches connected to the test terminals in the respective set are activated and for the other of energizing or deenergizing one or more of the test terminals in a group if the monitor switch connected to the respective said one or more terminals is deactivated. Visual indicator means connected to the test terminals illuminate a plurality of visual output devices corresponding respectively to the test terminals in a set if all of the pertaining test terminals in the set are energized, and extinguishes a visual output device pertaining to each terminal that is deenergized in that set.

If the machine develops a fault associated with the operation of any part such that the part does not assume its proper state, such as the mold not completely opening, the lack of adequate clamping pressure within the clamping cylinders to enable injection, or a motor not running, the monitor switch means associated with that part is deactivated. This causes the test terminal connected thereto to be either energized or deenergized with the pertaining visual output device either illuminated or extinguished, depending on the indication scheme utilized, so as to indicate the nature of the fault by the pattern of visual output devices illuminated at that time. It is preferred that the visual indicators, such as incandescent lamps or LED devices, be normally extinguished and illuminated when the machine is operating in the subsequence to which they correspond.

Alternatively, however, the visual indicators could be normally illuminated and extinguished during the corresponding subsequence of the machine.

The invention also relates to a method for indicating fault conditions in a machine, such as an injection molding machine, which sequentially cycles through a plurality of subsequences in which a plurality of faults can occur at each step of the subsequences. The machine includes a plurality of sensing devices each of which assumes a proper state at a respective given time in the machine cycle if the machine is operating properly, but assumes a fault state at the given time if a fault condition occurs. The method comprises providing an array of visual indicators physically grouped in a plurality of sequentially arranged sets with each set including a plurality of the indicators and with each set spatially set apart from the other sets so that it can be readily distinguished from the other sets, and with each set corresponding to a different subsequence of the machine. In a preferred embodiment, the sets are arranged by rows with only one set occupying a row. The states of the devices are monitored and the sets of visual indicators are sequentially activated if the devices assume their proper states as the machine cycles through its plurality of subsequences, the activation of the sets being in synchronism with the occurrence of the corresponding subsequences. If a device is of a fault state at the given time in the machine cycle for that device, operation of the machine is halted and less than all of the visual indicators for the set corresponding to the subsequence that the machine is in at that time are activated in a pattern coded to represent the device which is in a fault state at that time.

The preferred embodiment of the invention comprises an array of visual indicators arranged in rows corresponding to the various subsequences of the machine, and the rows of indicators are activated sequentially as the machine cycles through its various subsequences thereby enabling the operator to monitor at all times the subsequence in which the machine is presently operating. The activation of all lights in a set indicates that no fault conditions are present, but if one or more lights are extinguished, the pattern of lights indicates the nature and location of the malfunctioning sensing device such as a relay or pressure actuated switch.

A modification of the system could comprise a single row of indicators that are time shared among the various subsequences and somehow coded to indicate to the operator which subsequence the machine is in at that time. For example, a row of numerals in an LED display could indicate the subsequence, and the pattern of numerals illuminated could indicate the nature and location of the fault. Due to its simplicity and ease in reading, however, the primary embodiment of a full array is preferred.

It is an object of the present invention to provide a machine diagnostic system for use with various types of automatically operating machines, such as injection molding machines, which enables the machine operator to continuously monitor the operation of the machine and immediately read a code indicating a fault condition simultaneously with the occurrence of the fault.

It is a further object of the present invention to provide a machine diagnostic system that can be easily installed on virtually any type of existing machinery having an automatic controller without the necessity for modifying the circuitry or operation of the controller itself.

A still further object of the present invention is to provide a machine diagnostic technique that avoids the necessity for the machine operator to interrogate the machine controller in order to retrieve the fault condition data.

These and other objects of the present invention will be apparent from the detailed description of a preferred embodiment thereof considered together with the appropriate drawing figures.

DETAILED DESCRIPTION OF A PREFERRED EMBODIMENT

Figure 1:
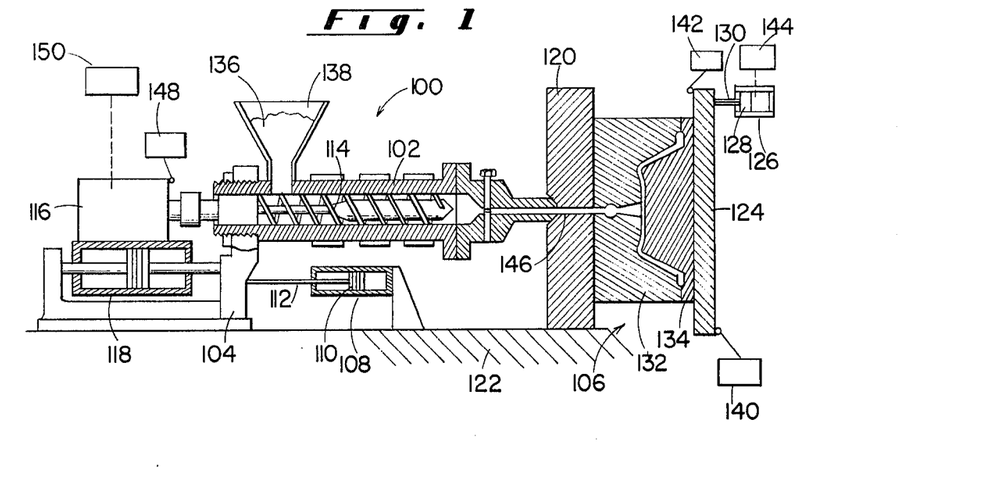
FIG. 1 is a diagrammatic view of a typical injection molding machine incorporating the diagnostic system of the present invention.

Referring now in detail to the drawings, FIG. 1 illustrates an injection molding machine 100 comprising a plasticizing extruder having a barrel 102 mounted on a supporting cradle 104, the latter being mounted for reciprocation toward and away from mold 106 by means of a hydraulic cylinder 108 having a piston 110 therein that is connected to cradle 104 by connecting rod 112. A plasticizing screw 114 is mounted within barrel 102 and rotated by hydraulic motor 116. Cylinder 118 is connected to motor 116 and serves to reciprocate screw 114 within barrel 102, not only to inject plastics material into the mold 106, but also to maintain a controlled back pressure on the screw during plasticizing.

Mold assembly 106 comprises a stationary platen 120 mounted to a stationary support 122, and a movable platen 124 moved toward and away from stationary platen 120 by hydraulic cylinder 126 having a piston 128 therein connected to movable platen 124 by connecting rod 130. Mold halves 132a and 134 are connected to platens 120 and 124, respectively. Thermoplastic material 136 is fed into barrel 102 through hopper 138.

The injection molding machine 100 illustrated in FIG. 1 is intended merely to illustrate some of the basic components of this type of machine, and is not intended to portray the particular commercially available machine. Its structure and operation have been greatly simplified in order to show the manner in which the diagnostic system of the present invention could be used in connection with it, and the invention is not limited to this particular type of injection molding machine nor to injection molding machines in general. In its broadest sense, the invention is intended for use with a wide variety of automatic and semiautomatic machines.

The operation of the particular injection molding machine 100 in question can be divided into eight separate steps or subsequences: motors running, single cycle selection, clamp forward, clamp pressure, injection forward, injection low pressure, extruder run and clamp reverse. Initially, the pump or pumps, to provide oil for the motor 116 for screw 114, is/are started and the automatic controller is set for single cycle operation, which means that the machine 100 will mold a single part, and must be manually restarted to mold the next part. The particular type of controller which is used on this machine or any other machine depends on the use to which the machine is to be put and will, therefore, vary from application to application. Machine controllers of this type have been used for many years and are present on virtually every injection molding machine and many other types of machines. They are manufactured either by the manufacturer of the machine, or purchased from an outside vendor and then supplied either directly to the customer by the vendor or by the manufacturer of the machine. Such controllers, which are well known in the art, comprise an assemblage of relays, a solid-state logic circuit or possibly even a programmable microprocessor, which monitors the various limit switches, pressure switches, timers, and the like on the machine, and then sequentially steps the machine through the desired process in accordance with the parameters set into it. In the case of injection molding machine, the controller opens and closes hydraulic valves, starts timers, turns motors on and off, etc. Due to the wide availability of commercial controllers and their use in virtually every type of automatic or semiautomatic machine or process in use, the construction and use of such controllers are well known to those of ordinary skill in the art.

Returning now to FIG. 1, once the motors 116 have been started and the single cycle mode has been selected on the controller, movable platen 124 is fully retracted so as to completely open mold 132, 134 and its completely open position is indicated by limit switch 140, for example. If a previously molded part is present within opened mold halves 132 and 134, it is removed, and movable platen 124 is extended towards stationary platen 120 by cylinder 126 until it is fully closed, as indicated by limit switch 142. Then, final clamping pressure is developed by cylinder 126, and when this pressure level has been reached as sensed by pressure sensitive switch 144, the charge of plasticized material built up in front of screw 114 is injected through passage 146 into mold 132, 134 by driving screw 114 forwardly through the action of cylinder 118. At this time, screw 114 is not rotating. Following injection and during hardening of the part within mold 132, 134, screw 114 maintains a low pressure on the material to compensate for any shrinkage which might occur. Following sufficient hardening of the part, screw 114 is again rotated to begin building up a new charge of material, and movable platen 124 is opened until limit switch 140 trips. Limit switch 148 senses the position of screw 114 during injection and/or retraction, and sensor 150 detects the operation of motor 116.

In a typical injection molding machine, there are many more limit switches, pressure operated switches and the like than illustrated in FIG. 1, and only a few of such switches have been shown so as to illustrate the principle of the invention. Moreover, the operation of a movable platen 124 in most injection molding machines is accomplished by two or more cylinders, one being a relatively low pressure cylinder capable of quickly advancing and retracting the platen, and the other being a plurality of short stroke, high pressure cylinders which exert the final clamping pressure necessary to withstand the internal pressures within the mold during injection. In order to more clearly teach the principles of the invention, however, the structure and operation of the machine 100 has been greatly simplified and only a few limit switches and the like have been shown.

Figure 3:
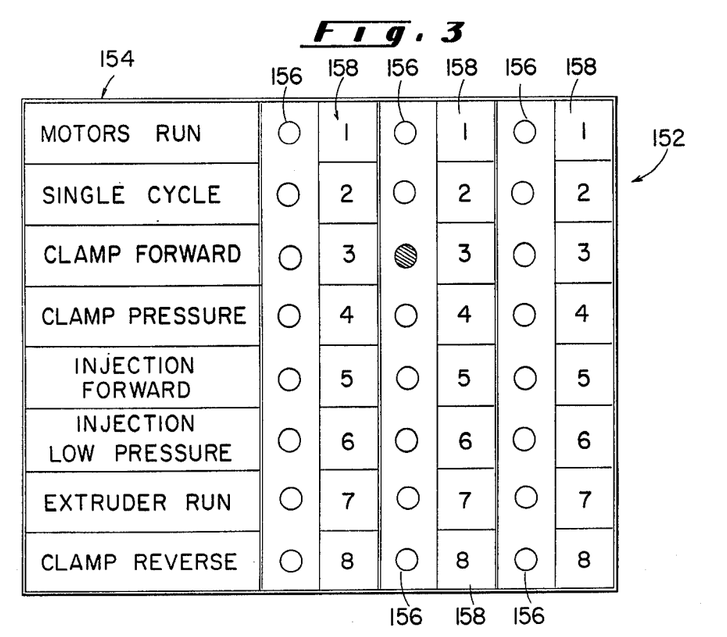
FIG. 3 is a view of the diagnostic display panel.

FIG. 3 illustrates an indicator light array 152 wherein the eight subsequences or steps of injection molding machine 100 are denoted in a column 154. To the right of column 154 are eight rows or sets of indicator lights 156, with each row comprising three such lights 156, and with each light 156 having numerical indicia 158 to the right of it indicating to which of the eight subsequences of the machine 100 the particular light 156 pertains. It will be noted that each row includes only those lights 156 pertaining to a single subsequence of the machine, and the subsequences are listed sequentially beginning with the motor run condition and ending with the clamp reverse subsequence.

As machine 100 cycles through its complete operating sequence, and if no fault conditions occur, then each of the three lights 156 in each row will be illuminated during the time that the machine 100 is in that subsequence. For example, if all of the motors for the hydraulic pumps are running, then all three lights 156 in the upper row and denoted with the numeral "1" will be illuminated. If a single cycle operation has been selected, and no fault conditions have yet occurred, then all of the lights 156 in the second row will be illuminated. In a similar fashion, when the clamp mechanism moves platen 114 forwardly sufficiently to close the mold halves 132 and 134, the lights 156 in the third row will all be illuminated.

If a fault condition should occur, such as the failure of the clamp mechanism to move movable platen 124 completely forwardly so as to trip limit switch 142, one or more of the lights 156 in the third row will not be illuminated, thereby presenting to the machine operator a pattern of lights which can be correlated with a diagnostic fault code listing to indicate specifically what the nature of the fault is. Although the fault condition indicated may not be limited to a single possibility, in most cases, it can be narrowed down to two possible malfunctions. For example a code of 003 meaning that only the third light in the third row is illuminated, indicates to the operator that either the gate is not closed or the safety dog has not cleared. The manner in which lights 156 are illuminated and the fault code generated will be described in detail in connection with FIGS. 2A-2D.

Figure 4:
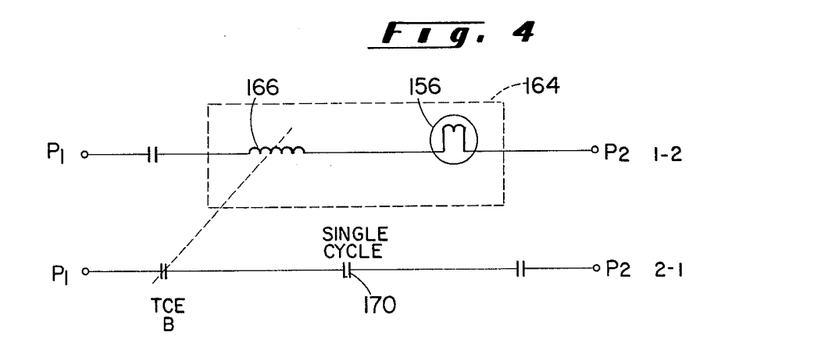
FIG. 4 is a detailed circuit schematic showing relationship between two of the visual indicator output branches of FIG. 2A.

Referring now to FIGS. 2A-2D, the circuit for the diagnostic system in the present invention is in the form of a ladder circuit having a voltage applied across terminals P1 and P2. Connected between the terminal buses 160 and 160 are a plurality of branch circuit lines each of which comprises a relay coil and indicator light circuit 164 denoted by the letters A through AA. Although in an actual embodiment of the invention, circuits 164 are simply relay coils or solid-state relay devices and the lights 156 (FIG. 3) are actuated by an additional pair of relay contacts or a solid-state gate, for purposes of description of the invention, each of circuits 164 will be considered to comprise both a relay coil 166 and a lamp 156, as illustrated in FIG. 4. Each of the branch lines is denoted by a numerical legend wherein the first number refers to the three visual indicator set and to the particular subsequence of the machine 100, and the second numeral refers to the branch for that particular set. For example, the first branch in the first set for the Motors Run condition is denoted "1-1".

Figure 2A:
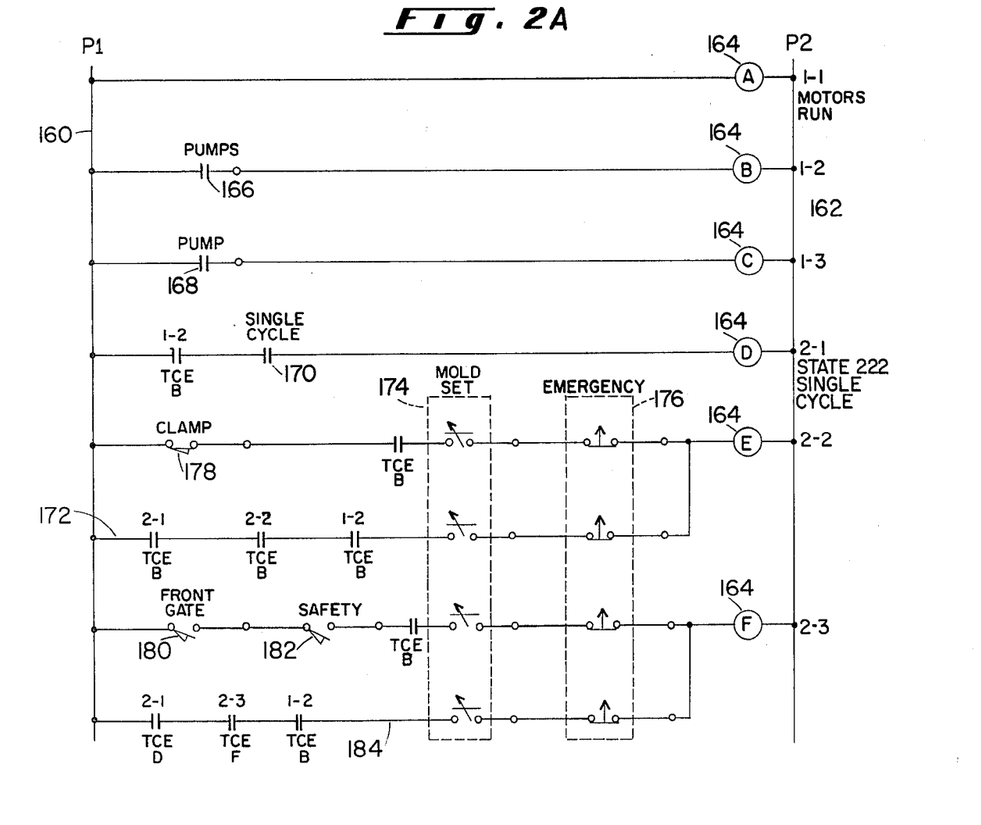
FIGS. 2A, 2B, 2C and 2D together constitute a detailed circuit schematic of the innerconnections between the monitor switches and the visual indicator outputs.

Circuit branch 1-1 comprises only a single relay and visual indicator circuit 164 connected between buses 160 and 162. Branch 1-2 comprises a pair of normally closed relay contacts 166 that indicate that the hydraulic pumps are running. The monitor switch 166 could either be a pair of relay contacts, a transistor, an electronic gate or other two-state device which permits current to pass when the motors are running, and presents an open circuit thereby preventing the passage of current when the motors are not running. For example, switch 166 could be a transistor or in the emitter and collector are connected in series and the base terminal is connected to a sensor on one of the pumps that produces an enabling voltage when the pump is running. Since the present invention is adapted to be incorporated with existing controllers, contacts 166 could be the actual contact pair in the controller itself, or an additional electronic device could be connected to the controller to monitor the condition of the controller contacts. In a very rudimentary form of the invention, the switch device 166 could even be the limit switch, pressure sensitive switch or other sensor device itself mounted on the machine, although it is unlikely that this would be the case in modern machinery due to its complexity. Connected in series with monitor switch contacts 166 is a relay coil and light circuit 164.

Branch circuit 1-3 comprises another monitor switch device 168 identical to switch 166 and connected to monitor the condition of one of the other hydraulic pumps in the machine 100. Like switch device 166, it is connected in series with a relay coil C.

Branch circuit 2-1 comprises a monitor switch device comprising a pair of contacts 170 that are closed when the single cycle relay on the control panel is actuated. It is connected in series with relay coil D, and also with a pair of normally open contacts TCE B. Contacts TCE B are actuated by relay coil B in branch 1-2 so that whenever relay coil B is energized, contacts TCE B will be closed, thereby also energizing relay contact D in line 2-1. Throughout the circuit of FIGS. 2A–2D, many contacts denoted TCE are shown, and they are normally open contacts operated by the relay coil that is identified. For example, in the shunt circuit branch 172 for branch 2-2, contacts TCE D are closed by relay coil D in branch 2-1. In the same branch, contacts TCE E are closed by the energization of relay coil E in branch 2-2. This arrangement ensures that for every branch output line 2-2, the previously established conditions necessary for the implementation of this subsequence or step in the operation of the machine remain valid for the controller to advance the machine to the next step of operation.

In branch circuits 2-2 and 2-3, there are two switch blocks 174 and 176 which will be closed if the molds are set and if the emergency switches have not been actuated. In branch 2-2, a monitor switch device 178 is closed if the clamping mechanism has fully retracted the movable platen 124, and relay coil E will be energized if the molds are set, emergency switches 176 are not actuated, platen 124 is fully retracted, and contacts TCE B remain closed due to the energization of relay coil 164 in line 1-2, which is the condition if the pump associated with contacts 166, remains running.

Referring now to branch circuit 2-3, in addition to the mold set and emergency switch contacts 174 and 176, there is a monitor switch 180 connected to the front gate limit switch, and a safety dog limit switch 182, both of which are connected in series with contacts TCE B relating back to coil B, and with coil F. Contacts TCE D, TCE F and TCE B are connected in series with switches 174 and 176 in the shunt circuit 184 for branch circuit 2-3.

Figure 2B:
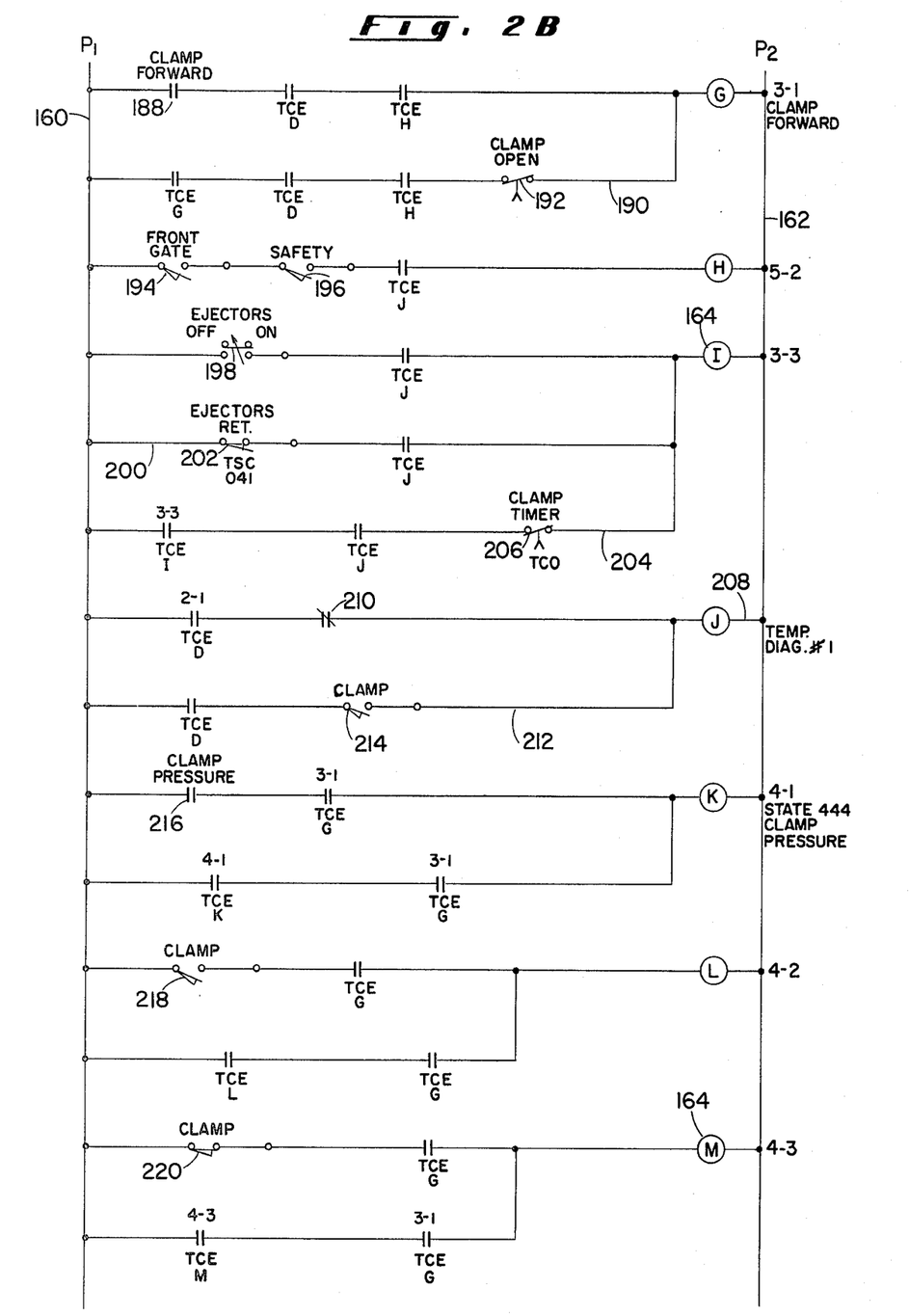
Figure 2C:
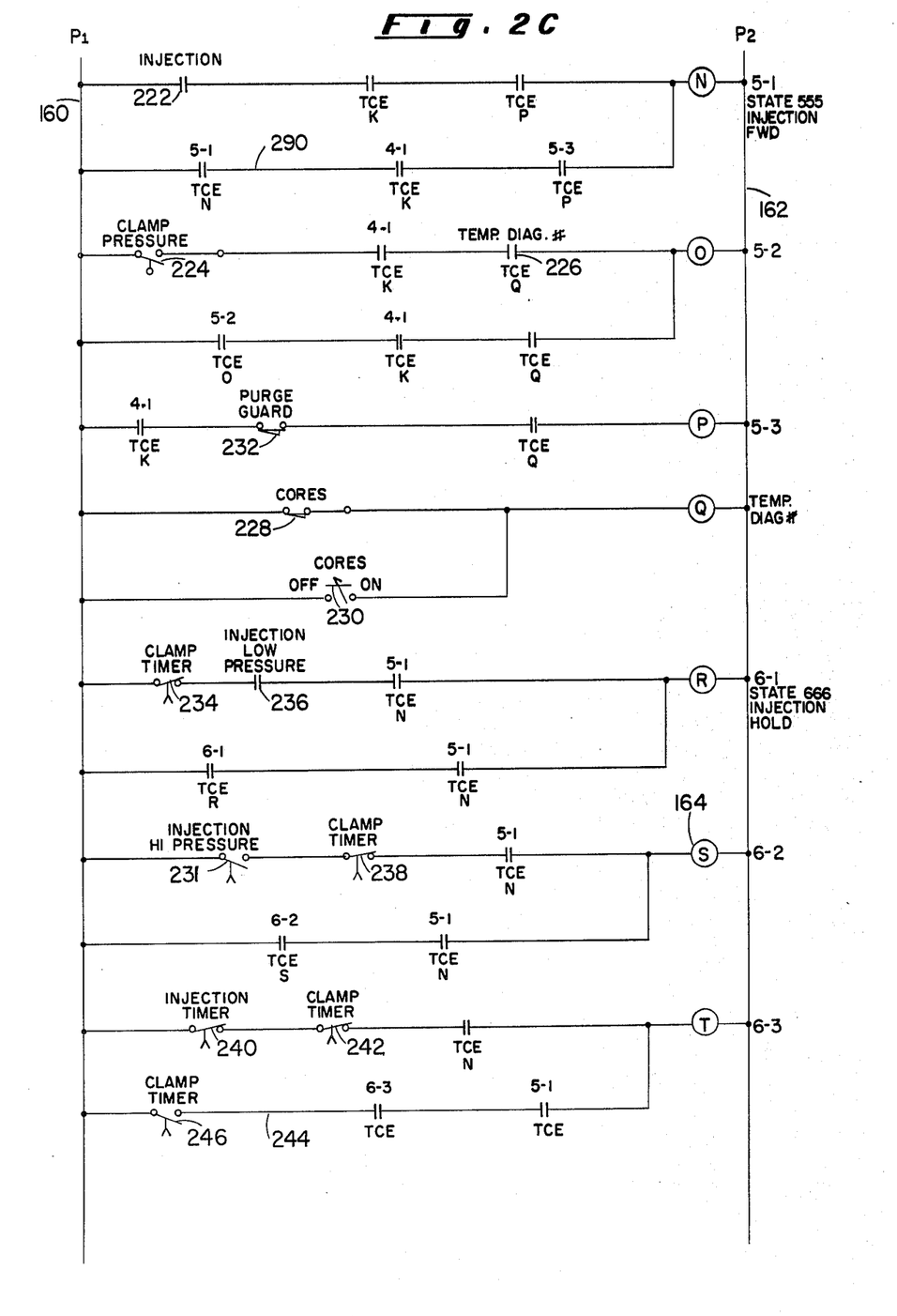
Figure 2D:
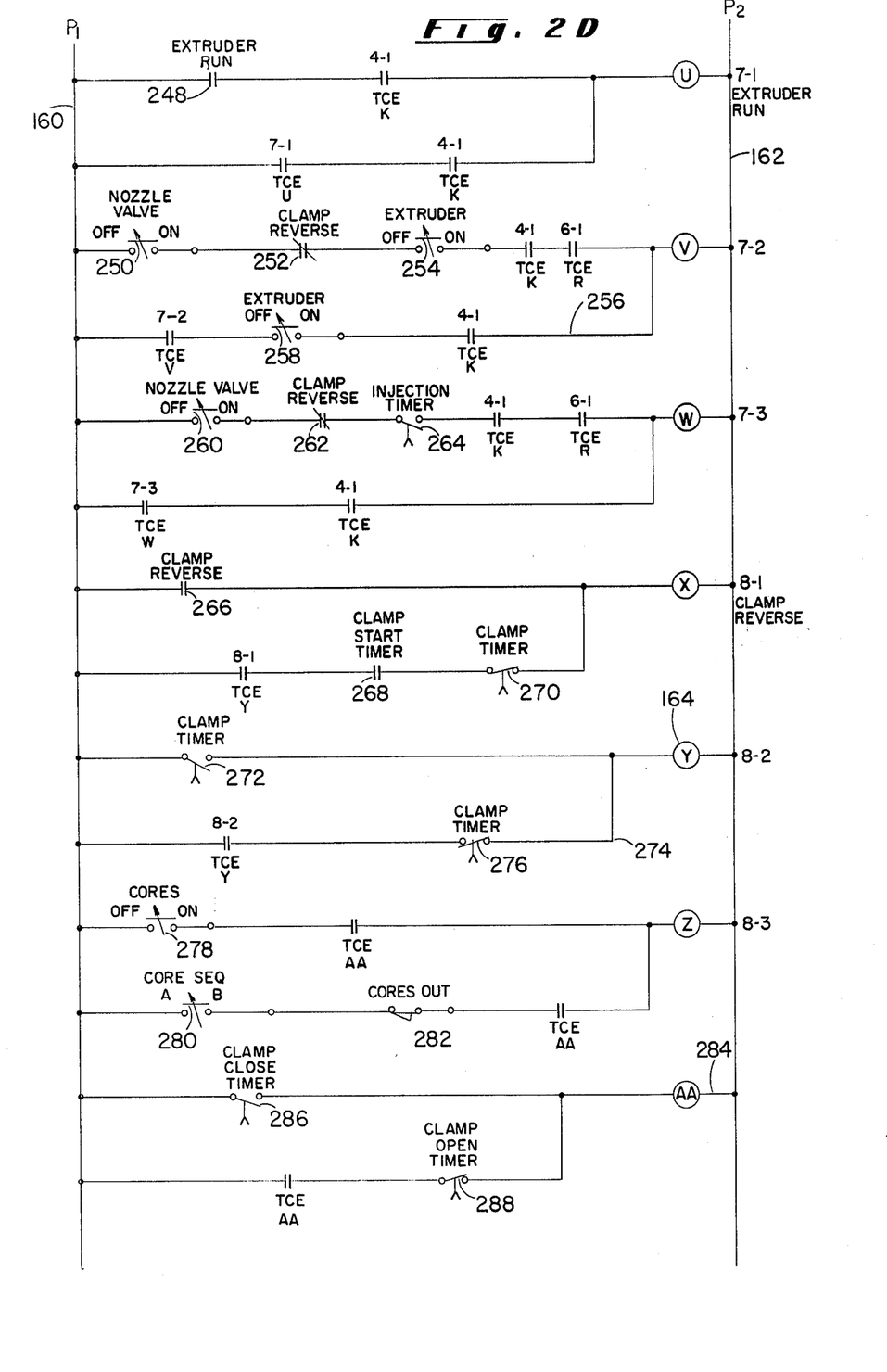

Referring now to FIGS. 2B, 2C and 2D, it will be noted that the same basic arrangement of relay coils and relay contacts is utilized thoughout the remainder of the circuit. In the case of each branch circuit 3-1 through 8-3, there are one or more TCE relay contacts that are actuated by either previous or subsequent relay coils G through AA, and by following the circuit through, the conditions precedent which must be maintained for the next branch circuit in the system to be activated can be determined. For this reason, a specific discussion of this type of relay contact will not be continued, and only those contacts or switches that relate to various limit switches, pressure sensitive switches, and the like connected with machine 100 will be described. The top of the circuit in FIG. 2B is connected to the bottom of the circuit in FIG. 1A, the top of the circuit in FIG. 2C is connected to the bottom of the circuit in 2B, and the top of the circuit in FIG. 2D is connected to the bottom of the circuit in FIG. 2C.

Branch circuit 3-1 comprises a clamp forward solenoid monitor switch 188, and the shunt circuit 190 for branch circuit 3-1 comprises a clamp open timer switch 192. Branch circuit 3-2 is connected in series the front gate limit switch monitor 194 and the safety dog limit switch monitor 196.

Branch circuit 3-3 comprises an ejector on/off switch monitor 198, shunt circuit 200 includes the monitor switch for the ejectors fully retracted limit switch, and the second shunt circuit 204 includes a clamp open timer monitor 206. Branch circuit 208 is a temperature diagnostic output comprising a relay coil J, a pair of normally closed contacts 210 which monitor the resetting of the clamp open timer, and shunt circuit 212 comprises the monitor 214 for the clamp not fully retracted limit switch. Branch circuit 4-1 comprises the clamp pressure monitor 216, which is energized when full clamp pressure is reached. For example, this monitor 216 would be controlled by the output of pressure sensitive switch 144 (FIG. 1). Branch circuit 4-2 comprises the monitor 218 for the clamp closed limit switch 142, and branch circuit 4-3 includes the monitor 220 for the clamp forward slow down limit switch release.

Referring now to FIG. 2C, branch circuit 5-1 comprises the monitor contacts 222 for the injection forward solenoid valve, branch circuit 5-2 comprises the monitor 224 for the clamp pressure switch operated with clamp pressure, and contacts 226 are closed by the energization of relay coil Q (FIG. 2C) when the contacts 228 for the mold cores being extended and the mold core on/off switch 230 are closed. Branch circuit 5-3 includes the purge guard closed limit switch monitor 232.

Branch circuit 6-1 comprises the monitor 234 for the clamp closed timer not being timed out and the monitor 236 for the injection low pressure solenoid valve. Branch circuit 6-2 comprises the monitor 231 for the injection high pressure timer being timed out and the monitor 238 for the clamp closed timer not being timed out. Branch circuit 6-3 includes the monitor 240 for the overall injection timer not being timed out, and monitor 242 for the clamp closed timer not being timed out, and the shunt circuit 244 includes the monitor 246 for the clamp closed timer being timed out.

Referring now to FIG. 2D, branch circuit 7-1 comprises the monitor contacts 248 for the extruder run solenoid valve. Branch circuit 7-2 comprises the nozzle valve on/off monitor switch 250, the clamp reverse solenoid valve monitor 252, the extruder on/off switch 254, and shunt circuit 256 also includes the extruder on/off switch monitor 258. Branch circuit 7-3 comprises the nozzle valve on/off switch monitor 260, the clamp reverse solenoid valve monitor 262, and the monitor 264 for the injection overall timer being timed out.

Branch circuit 8-1 comprises the clamp reverse monitor contacts 266, the clamp start timer monitor 268, and the monitor 270 for the clamp timer not being timed out. Branch circuit 8-2 includes the monitor 272 for the clamp closed timer being timed out, and the shunt circuit 274 includes the monitor 276 for the clamp closed timer being timed out. It will be noted that monitor 272 is normally open whereas monitor 276 is normally closed. Branch circuit 8-3 comprises the cores on/off switch monitor 278, the sequence monitor 280, and the cores out limit switch monitor 282. The last branch circuit 284 is a diagnostic step comprising the clamp closed timer timed out monitor switch 286, and the normally closed clamp open timer not timed out monitor switch 288.

The circuit shown in FIGS. 2A through 2D utilizes the test coils, contact and switches of a Barber Colman MACO IIIB injection molding machine controller. In accordance with the present invention, the outputs are grouped in such a manner that the lights 156 of the display panel shown in FIG. 3 are illuminated as sets in sequence as the machine properly cycles through its various operations including clamp closing, the application of clamping pressure injection, injection low pressure, and clamp opening. Relay coils A, B and C energize the lights 156 in the first row, which pertain to the first subsequence of the machine. FIG. 4 illustrates one manner in which the visual indicator 156 could be energized by the activation of the pertaining branch circuit, although it could also be energized by a relay operating off the coil 166 in the pertaining branch circuit, by a transistor, or by an electronic gate having its control terminal connected to the pertaining branch circuit.

Branch circuits 1-1, 1-2, and 1-3 control the lights 156 for the top row in display panel 154 with line 1-1 controlling the leftmost light 156, line 1-2 controlling the center light 156, and line 1-3 controlling the rightmost light 156. In a similar fashion, line 2-1 controls the leftmost light 156 in the second row of display panel 154, line 2-2 controls the center light, and line 3-3 controls the rightmost light 156. This innerconnection scheme continues throughout the circuit of FIGS. 2A-2D through the last branch circuit line 8-3, which controls the right-most light 156 in the lowest row, which pertains to the clamp reverse subsequence of the machine.

In the event that a fault condition occurs, when the processor reaches the three branch circuits for that subsequence of the machine operation, one or more of the switch monitors in one or more of the branches for that set will be open thereby not energizing the series connected relay coil and not illuminating the corresponding light. The malfunction will manifest itself on display panel 154 as a pattern of lights where less than all of the lights 156 are illuminated. By reading this code off a diagnostic fault code listing, the location and nature of the fault can be readily determined. If no fault condition is present for a particular subsequence of the machine, then all three lights 156 will be illuminated.

By way of example, the functioning of circuit branches 5-1, 5-2 and 5-3 will be described. Prior to this time, the lights 156 for the first, second, third and fourth rows were all illuminated in succession, thereby indicating that no faults had occurred. Since coil K is energized due to the continued application of final clamping pressure contacts TCE K will be closed. Next, referring to line 5-3, if the purge guard is closed so that contacts 232 are closed and if the cores are in so that contacts 228 are closed thereby energizing coil Q and closing contacts TCE Q, then coil P will be energized so as to close contacts TCE P. If the injection forward solenoid valve causes contacts 222 to be closed, then coil N will be energized and the leftmost light 156 in line 555 of the display panel (FIG. 3) will be illuminated. The energization of coil N also closes contacts TCE N in the shunt circuit 290, which functions as a latching circuit.

Next, the clamp pressure monitor switch 224 must remain closed, and if coil Q is still energized, then coil O will also be energized thereby illuminating the second light in line 555. Next, if the purge guard remains closed so that contacts 232 are closed, then the third light 156 in line 555 of display 154 will be illuminated. With all three lights 156 in this line illuminated, a "no fault" condition is indicated to the machine operator.

If a fault condition would occur, such as the cores not being set, then switch 228 would be open thereby failing to energize coil Q, which opens contacts TCE Q in line 5-3 thereby failing to energize coil P, which in turn, opens contacts TCE P in line 5-1 and the shunt circuit 290 so that coil N would also not be energized. Since contacts TCE Q in line 5-2 are not energized, none of the lights 555 on display panel 154 would be illuminated. By referring to the diagnostic fault code, this would indicate that the cores are not set or are not off. If the cores are set, however, but the clamp pressure switch is not operated so that monitor switch 224 is open, then coil P would still be energized so that the rightmost light in line 555 would be illuminated. Since the clamp pressure relay monitor 216 in line 4-1 (FIG. 2B) would also be open, then relay K is deenergized thereby opening contacts TCE K in branch circuits 5-1 and 5-2. This causes the leftmost and center lights 156 in line 555 to be extinguished thereby providing the code 0-0-5 to the operator indicating that the clamp pressure switch is not operated.

If the purge guard is not closed, then contacts 232 in circuit branch 5-3 would be open thereby energizing relay coil P. Since contacts TCE P are also open, relay N would be deenergized and the light code for this type of fault is 0-5-0. Thus, it is immediately clear to the operator what the nature of the fault condition is as soon as it occurs, without the necessity for interrogating a microprocessor or spending a great deal of time comparing solenoid indicator lights with the machine manual.

The following is a listing of possible states of the lights 156 on display panel 154 with the corresponding faults:

| STATES | FAULTS |
| --- | --- |
| 111 | No faults |
| 100 | Motor is not running or rear guard open |
| 222 | No faults-single cycle |
| 000 | Mold set not off |
| 002 | Clamp not retracted to clamp open limit switch |
| 020 | Gate not open or safety dog not released |
| 333 | No faults - clamp forward |
| 000 | Timer not timed out |
| 003 | Gate not closed or safety dog not cleared |

| STATES | FAULTS |
|---|---|
| -continued | |
| 030 | Ejector is not retracted or off |
| 444 | No faults - clamp pressure |
| 004 | Clamp not reached |
| 040 | Clamp forward slow down not reached |
| 555 | No faults - injection forward |
| 000 | Cores not set or not off |
| 005 | Clamp pressure switch not operated |
| 050 | Purge guard not closed |
| 666 | No faults - injection low pressure |
| 000 | Clamp closed timer has timed out |
| 006 | Injection high pressure timer has not timed out |
| 060 | Injection overall timer has timed out |
| 777 | No faults - extruder run |
| 000 | Nozzle valve is off and clamp closed timer has timed out |
| 007 | Extruder not on |
| 070 | Injection overall timer has not timed out |
| 888 | No faults - clamp reverse |
| 000 | Clamp closed timer has not timed out |
| 080 | Cores not retracted |

Although display panel 154 in the preferred embodiment comprises a plurality of lamps 156 for the visual indicators, other types of visual output devices could be used. For example, an LED display could display the actual numbers for the machine subsequences, or this same technique could be implemented by a liquid crystal display.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In an injection molding machine having clamp means for opening and closing a mold, an extruder having a rotatable plasticizing screw, and injection means for axially moving the screw to inject plasticized material into a mold, said clamp means, extruder and injection means each comprising a plurality of components which normally assume a given proper state during the cycling of the machine through its operating sequence comprising a plurality of major operating steps, it being necessary for a respective given plurality of components to assume their proper states for the machine to accomplish each major operating step; a diagnostic monitoring system for monitoring the opening and closing of the mold by the clamp means, the operation of the extruder and the injection of the material into the mold by the injection means as the injection molding machine cycles through its major operating steps in its operating sequence comprising:

a plurality of monitor switch means, a plurality of means respectively connected between said monitor switch means and the components of the clamp means, extruder and injection means for activating each said monitor switch means when the pertaining component assumes its proper state during the operation of the clamp means, extruder or injection means with which it is associated and for deactivating each said monitor switch means when the pertaining machine component fails to assume its proper state during the operation of the clamp means, extruder or injection means with which it is associated, a plurality of visual indicators physically grouped in a plurality of sequentially arranged sets wherein each set comprises a plurality of said indicators and each set is spatially set apart from the other sets so that it can be readily distinguished from the other sets, each set corresponding to a major operating step of the machine and comprising a plurality of indicators that pertain to the components that are required to assume their proper states before the machine can perform the pertaining major operating step, means operatively interconnecting said indicators with said monitor switch means for one of energizing or deenergizing the respective sets of indicators in succession in the order in which they are arranged as said machine cycles through its major operating steps if the monitor switch means connected to the indicators in the respective set are activated and for the other of energizing or deenergizing one or more of the indicators in a set if the monitor switch means connected to the respective said one or more indicators are deactivated, the pattern of activated and deactivated indicators in each set indicating whether a fault exists for the pertaining major step and also the source of the fault, if one exists, for the pertaining major step, whereby if the clamp means opens and closes the mold properly and the extruder operates properly and the injection means properly injects the charge of material, the sets of indicators are sequentially one of energized or deenergized and if the machine develops a fault associated with the operation of any of the clamp means, extruder or injection means so that one of the pertaining components does not assume its proper state, the monitor switch means associated with that part will be deactivated and will cause the indicator connected thereto to be the other of energized or deenergized so as to indicate the source of the fault by the pattern of energized indicators in the pertaining set.

2. The injection molding machine of claim 1 wherein some of said means for activating said monitor switch means comprise limit switch actuators actuated by movable components of said machine.

3. The injection molding machine of claim 2 wherein others of said means for activating said monitor switch means comprise hydraulic pressure responsive devices connected to hydraulic cylinders in said machine.

4. The injection molding machine of claim 1 wherein the visual indicators are arranged in rows with the indicators of each set being in a row different than the indicators of the other sets.

5. The injection molding machine of claim 4 wherein the visual indicators are individual lights and said means interconnecting said indicators and monitor switch means energize the lights when the pertaining monitor switch means are activated.

6. The injection molding machine of claim 1 wherein said monitor switch means each comprises a pair of terminals connected in series with a source of voltage and said visual indicators, and means for short circuiting said terminals in response to the attainment of the proper state by the pertaining machine component.

7. The injection molding machine of claim 6 wherein said monitor switch means are electronic switches.

8. In a machine having a plurality of parts that normally assume proper given states during the cycling of the machine through a plurality of steps in its operating sequence comprising a plurality of major operating steps, it being necessary for a respective given plurality of the components to assume their proper states for the machine to accomplish each major operating step, a diagnostic monitoring system for monitoring the cycling of the machine through its major operating steps comprising:

a plurality of monitor switch means, a plurality of means respectively connected between said parts of the machine and said monitor switch means for activating each said monitor switch means when the pertaining machine part assumes its proper state during the cycling of the machine and deactivating each said monitor switch means when the pertaining machine part fails to assume its proper state during cycling of the machine, a plurality of visual indicators physically grouped in a plurality of sequentially arranged sets wherein each set comprises a plurality of said indicators and each set is spatially set apart from the other sets so that it can be readily distinguished from the other sets, each set corresponding to a major operating step of the machine and comprising a plurality of indicators that pertain to the components that are required to assume their proper states before the machine can perform the pertaining major operating step, means operatively interconnecting said indicators with said monitor switch means for one of energizing or deenergizing the respective sets of indicators in succession in the order in which they are arranged as said machine cycles through its major operating steps if the monitor switch means connected to the indicators in the respective set are activated and for the other of energizing or deenergizing one or more of the indicators in a set if the monitor switch means connected to the respective said one or more indicators are deactivated, the pattern of activated and deactivated indicators in each set indicating whether a fault exists for the pertaining major step and also the source of the fault, if one exists, for the pertaining major step, whereby if the machine cycles properly, the sets of indicators are sequentially one of energized or deenergized and if the machine develops a fault associated with the operation of any part such that the part does not assume its proper state, the monitor switch means associated with that part will be deactivated and will cause the indicator connected thereto to be the other of energized or deenergized so as to indicate the source of the fault by the pattern of energized indicators in the pertaining set.

9. The machine of claim 8 wherein some of said means for activating said monitor switch means comprise limit switch actuators actuated by movable parts of said machine.

10. The machine of claim 9 wherein others of said means for activating said monitor switch means comprise hydraulic pressure responsive devices connected to hydraulic cylinders in said machine.

11. The machine of claim 8 wherein said visual indicators are arranged in a plurality of rows with the indicators of each set being in a different row than the indicators of the other sets.

12. The machine of claim 8 wherein said machine is an injection molding machine comprising clamp means for opening and closing a mold, an extruder including a rotating plasticizing screw, and injection means for injecting a charge of plasticized material into the mold, and said means for actuating said monitor switch means comprise limit switch actuators actuated by movable parts of the clamp means and injection means, and further comprise pressure actuated devices connected to cylinders of said clamp means.

13. The machine of claim 8 wherein the visual indicators are individual lights and said means interconnecting said indicators and monitor switch means energize the lights when the pertaining monitor switch means are activated.

14. The machine of claim 8 wherein said monitor switch means each comprises a pair of terminals connected in series with a source of voltage and said visual indicators and means for short circuiting said terminals in response to the attainment of the proper state by the pertaining machine part.

15. The machine of claim 14 wherein said monitor switch means are electronic switches.

* * * * *